United States Patent

[11] 3,609,661

[72] Inventors Jacques Marcel Hennes
Paris;
Marc Jean Pierre Leger, Issy-les-Moulineaux; Claude Paul Henri Lerouge, Maurepas, all of France

[21] Appl. No. 824,583
[22] Filed May 14, 1969
[45] Patented Sept. 28, 1971
[73] Assignee International Standard Electric Corporation
New York, N.Y.
[32] Priority May 17, 1968
[33] France
[31] 152195

[54] MATRIX HAVING MOS CROSS-POINTS CONTROLLED BY MOS MULTIVIBRATORS
4 Claims, 3 Drawing Figs.

[52] U.S. Cl. 340/166, 340/167, 340/168
[51] Int. Cl. H04q 3/00
[50] Field of Search 340/166

[56] References Cited

UNITED STATES PATENTS

| | | | |
|---|---|---|---|
| 2,912,486 | 11/1959 | Shanahan | 340/166 X |
| 3,072,886 | 1/1963 | Greanias | 340/166 X |
| 3,458,659 | 7/1969 | Sternung | 340/166 X |
| 3,480,959 | 11/1969 | Richmond | 340/166 X |
| 3,493,932 | 2/1970 | Yu | 340/167 X |

*Primary Examiner*—Harold I. Pitts
*Attorneys*—C. Cornell Remsen, Jr., Walter J. Baum, Percy P. Lantzy, J. Warren Whitesel, Delbert P. Warner and James B. Raden

ABSTRACT: An electronic switching system employing MOS monolithic transistors in a matrix of cross-points is disclosed. Control of the cross-points is provided by shift registers which operate in response to codes instead of a free running clock. Individual cross-points in the matrix can be closed regardless of the status of the other cross-points in the respective line.

Inventors
J.M. HENNES M.J.P. LEGER
C.P.H. LEROUGE
By
Attorney

MATRIX HAVING MOS CROSS-POINTS CONTROLLED BY MOS MULTIVIBRATORS

The present patent of addition concerns improvements to multiselectors for switching stages in which contacts located at the cross-points are replaced by field-effect transistors and in which said cross-points are maintained electronically in closed position.

It is a well-known fact that field-effect or FET transistors and, in particular, metal-oxide-silicon FET transistors or "MOS transistors," have interesting characteristics when used as circuit-completing elements. In fact, the drain-source resistance of a MOS transistor which constitutes the switched circuit-completing element, is strictly voltage controlled so that there is a very good insulation of the control circuit with regard to the energized circuit.

Moreover, in this type of transistor, the drain-source resistance is higher than $10^7$ ohms in the "high-impedance off" state and as low as 100 to 300 ohms in the "low impedance on" state which ensures very good operating characteristics as a circuit-completing element.

Another advantage of a multiselector equipped with MOS transistors as circuit completing components lies in the fact that the selection and control circuits can also be designed with MOS transistors, both as regards the active components and the resistors. Consequently, multiselector matrices can be made with capacities of 4×2, 4×4, 4×8 etc... cross-points in large scale integrated circuits which may comprise several hundred MOS transistors.

In the main patent M. J. P. Leger — C. P. H. Lerouge — J. H. Dejean 3–10–16 U.S. Pat. application Ser. No. 788,114 filed Dec. 5, 1968, and in its first patent of addition P. Girard — M. J. P. Leger — C. P. H. Lerouge J. H. Dejean 10–4–14 –17 U.S. Pat. application Ser. No. 819,700 filed Apr. 28, 1969, one describes multiselectors arranged in a matrix form wherein a switching circuit placed at each cross-point comprises in particular, a circuit completing component made up of MOS transistors. The said circuit is controlled by applying selection signals in a predetermined order. The present patent of addition describes a multiselector arranged in matrix form in which a switching circuit is controlled by applying simultaneously two selection signals and a signal which controls the opening or the closing of the contact. This mode of control has the advantage of minimizing the number of outputs of the large scale integrated circuit which makes up the elementary multiselector.

The object of the present invention is therefore to realize an elementary electronic multiselector in large scale integrated circuit.

It is a feature of the invention that a switching circuit is located at each cross-point between two perpendicular speech conductors of the multiselector which are respectively a vertical *j* and a horizontal *k*, that said circuit comprises first a contact element made up of a MOS transistor the source and drain of which are connected, respectively, to the vertical *j* and to the horizontal *k* and second, a holding flip-flop comprising transistors of the same type with its 1 output connected to the switching transistor grid so that, when said flip-flop is in the 1 state, said transistor is conducting ("low impedance on" state) which corresponds to the closing of a pair of contacts connecting conductors *j* and *k*.

Another feature of the invention is that an elementary multiselector matrix comprises *m* verticals and *n* horizontals to which the same number of selection conductors are associated plus two control conductors *b*0 and *b*1, that the selection of the switching circuit S*jk* is effected by simultaneously applying a signal C*j* to vertical selection conductor *cj*, a signal S*j* to horizontal selection conductor *sj*, and a signal B0 (B1) to the conductor *b*0 (*b*1), the signal B0 (B1) controlling the setting to the 0(1) state of the holding flip-flop of circuit X*jk*.

Another feature of the invention is that the vertical and horizontal selection conductors are connected to the corresponding outputs of a first and a second shift register into which codes are fed to ensure the vertical and the horizontal selection in the matrix and that, in this case, the signal B0 or B1 is applied once the registers are completely loaded.

The above-mentioned and other features and objects of this invention will become apparent by reference to the following description taken in conjunction with the accompanying drawings in which.

Figure 1:
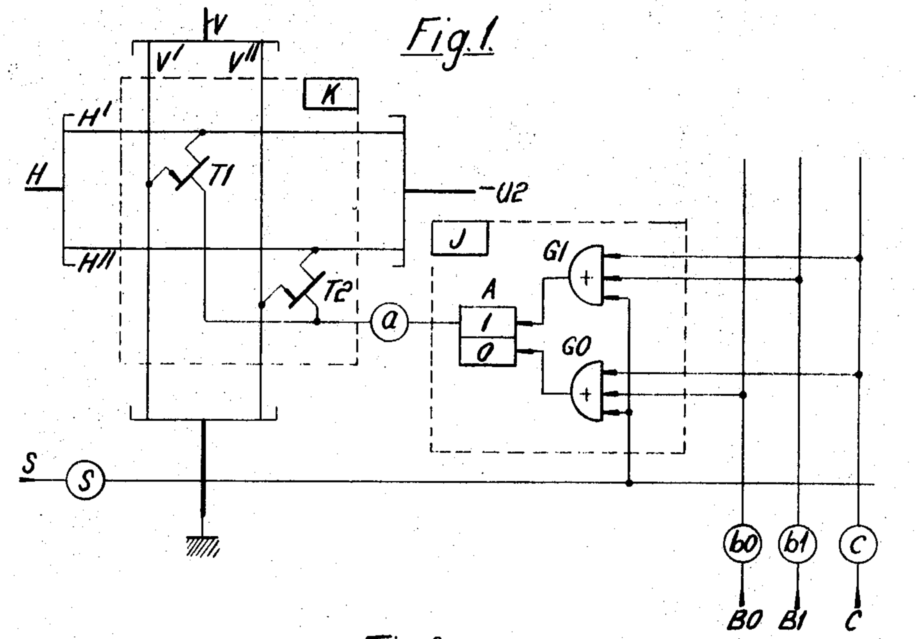
FIG. 1 shows a switching circuit.
Figure 2:
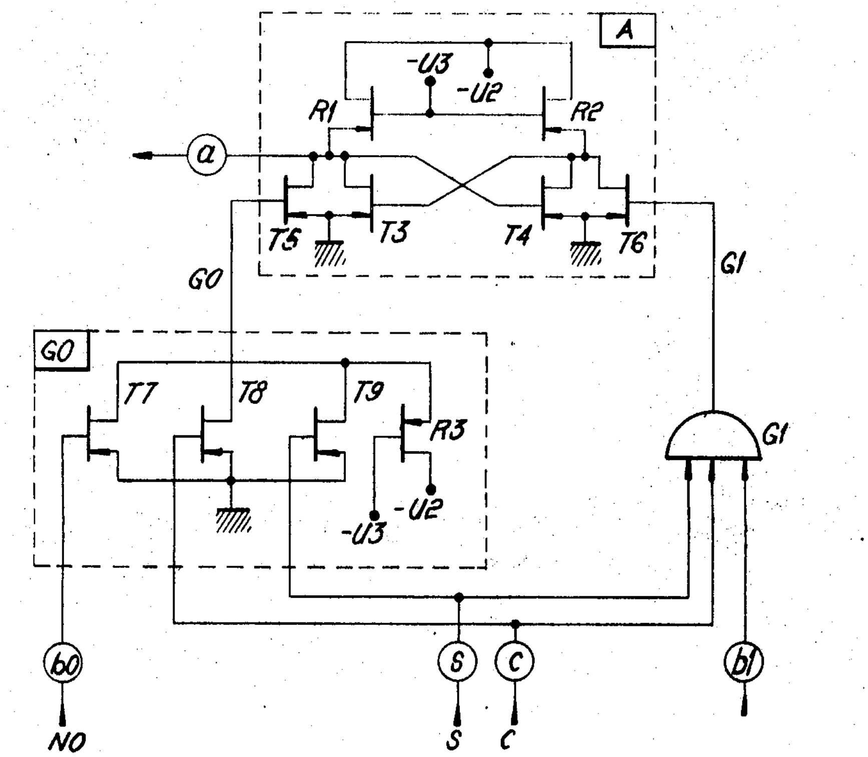
FIG. 2 shows a detailed diagram of a control circuit.

Before providing a description of the invention itself, the main characteristics of MOS transistors and their mode of operation will be reviewed. All the transistors shown in FIGS. 1 and 2 are of this type.

A MOS transistor is almost completely symmetrical and the electrodes which operate as drain and source can be inverted without any disadvantages and without modifying its operation when it is used in logic circuits. Nevertheless the manufacturer defines, in the specifications, the electrodes which play the part of drain and source. Consequently, in the figures, the source is symbolized by an arrow as is the emitter of a bipolar transistor.

The operating voltages of a MOS-Ph transistor (type *P*, enhancement transistor) are defined as follows:

*VT*: threshold voltage,

*VD*: drain voltage,

*VG*: grid voltage.

All these voltages are measured with reference to that of the source ($VS=0$) and expressed in absolute values. Thus, a MOS transistor is in its "high impedance off" or "blocked" state when $VG \leq VT$. It then has a drain-source resistance *RDS* whose value is practically infinite (approximately $10^7$ ohms).

A MOS transistor is "on" when $VG>VT$. It then behaves like a passive resistance whose value is $RDS=1/K(VG-VT)$ (1), *K* being a proportionality factor.

In this case there are two "on" regions:

the "low impedance on" region (or nonsaturated region) when $VD<VG-VT$, with a drain-source resistance *RDS* of low value (50 to 200 ohms). The "high impedance on" region (or saturated region) when $VD \geq VG-VT$, with a resistance *RDS* of relatively high value.

When utilized in logic circuits the voltages applied to the transistors are so chosen that they are either blocked or conducting in the low impedance on region.

If a MOS-Ph transistor has a threshold voltage of $VT=4v$ and that a voltage $VG=0$ is applied to it, it becomes blocked. If a voltage $VG=-24v$ and a voltage *VD* between zero and −20 volts are applied to said transistor, it becomes conducting. In practice, if a good linearity of resistance *RDS* is required, one must use lower values of *VD*. The resistance *RDS* then has a very low value and the transistor allows bidirectional transfer of analog or digital signals between drain and source.

MOS transistors are also used as resistors. Consequently large scale integrated circuits can be designed, this passive element operation being practicable for both types of conduction. For instance, if the transistor operates in the low impedance on region with a suitable bias ($VD<VG-VT$) and is connected in series with an inverter MOS transistor, either the voltage *VD* or the ground voltage appears at the connection common to both transistors depending on whether said inverter transistor is off ($VG \leq VT$) or on ($VG>VT$).

In the various figures accompanying this description, MOS transistors operating as active components are referenced "T" and those operating as load resistors bear the reference "R."

FIG. 1 shows the circuits associated to the cross-point between horizontals H', H'' and verticals V', V'' of a multiselector matrix; each pair of speech conductors H', V' and H'', V'' ensuring the transmission of information in one direction as was explained in the main patent M. J. P. Leger — C. P. H. Lerouge — J. H. Degean 3–10–16 and its first patent of addition P. Girard — M. J. P. Leger — C. p. h. Lerouge — J. H. Dejean 10–4–14–17 referred to above.

The circuits shown in said figure comprise:

The bidirectional cross-point K which ensures the connection between conductors H'–V' and H''–V'' when the MOS-Ph transistors T1 and T2 are conducting. The control signal of this circuit is applied to the grids of the transistors on the conductor *a*.

The control circuit J comprising the holding flip-flop A and the NOR circuits G0 and G1. The 1 output of this flip-flop is connected to the control conductor *a* of the circuit K.

Since each NOR gate is connected to three of the four conductors *s, c, b*0, *b*1, the gate G0 delivers a signal of amplitude—U2 when conductors *s, c, b*0 reach ground potential and gate G1 delivers a signal of amplitude—U2 when conductors *s, c, b*1 reach ground potential. When at least one of the inputs of a gate is at the potential—U2, the latter delivers a zero amplitude signal. By way of example, we shall choose $|U2| = 18$ volts.

Table I shows the various logic signals applied to these conductors as well as their voltage levels and the designation of the said signals.

Let G0 and G1 be the signals delivered by gates G0 and G1 (their voltage levels are indicated in the table). The following equation may be written:

$Gd=C.S.B.)$ $G1=C.S.B1.$

Said signals G0 and G1 control, respectively, the setting into the 0 and into the 1 of the flip-flop A.

When said flip-flop is in the 1 state, it delivers a signal A of amplitude—U2 which makes transistors T1 and T2 conducting. The sources of said transistors are grounded and the drains at potential—U2.

TABLE I

| Conductor | Signal | Voltage | Designation |
|---|---|---|---|
| c | C | 0 | Vertical selection signal. |
| | $\overline{C}$ | −U2 | |
| s | S | 0 | Horizontal selection signal. |
| | $\overline{S}$ | −U2 | |
| bo | Bo | 0 | Release signal. |
| | $\overline{Bo}$ | −U2 | |
| b1 | B1 | 0 | Closing signal. |
| | $\overline{B1}$ | −U2 | |
| | G0, G1 | −U2 | Control signals for the holding flip-flop. |
| | $\overline{G0}$, $\overline{G1}$ | 0 | |
| a | A | −U2 | Control signal for the crosspoint. |
| | $\overline{A}$ | 0 | |

These transistors then have a drain-source resistance of between 100 and 300 ohms and allow transmission of analog or digital signals.

FIG. 2 shows a detailed diagram of the control circuit J in which the flip-flop A comprises the MOS-Ph transistors T3, T4, T5, T6, R1, R2 and each gate, such as gate GO, comprises MOS-Ph transistors T7, T8, T9 and R3. By way of example it will be assumed that the grid voltage of transistors R1, R2 and R3 operating as resistances is $|U3| = 30$ volts.

The operation of flip-flop A in which transistors T5 and T6 are used to control the switching is similar to that of a flip-flop equipped with PNP bipolar transistors and will not be described in detail.

Table II below indicates the state of transistors T3 and T4 according to whether the flip-flop is in the 1 or 0 state as well as the state of the cross-point K and the value of the drain voltages of said transistors.

TABLE II

| State of the flip-flop | State of the transistors T3 | T4 | State of the cross point | Voltage levels 1 output (drain of T3) | 0 output (drain of T4) |
|---|---|---|---|---|---|
| 1 state | Blocked | Conducting | Closed | [1] −U2 | 0 |
| 0 state | Conducting | Blocked | Open | [2] 0 | −U2 |

[1] Signal A. [2] Signal $\overline{A}$.

By referring to FIG. 2 it can be seen that the grids of the control transistors T5 and T6 are brought either to the potential—U2 (logic conditions G0, G1) or to the ground potential (conditions $\overline{G0}$, $\overline{G1}$). For the logic condition G0, the transistor T5 is conducting and flip-flop A resets into the 0 state (condition $\overline{A}$) and for the condition G1, the transistor T6 is conducting and the flip-flop sets into the 1 state (condition A).

Figure 3:
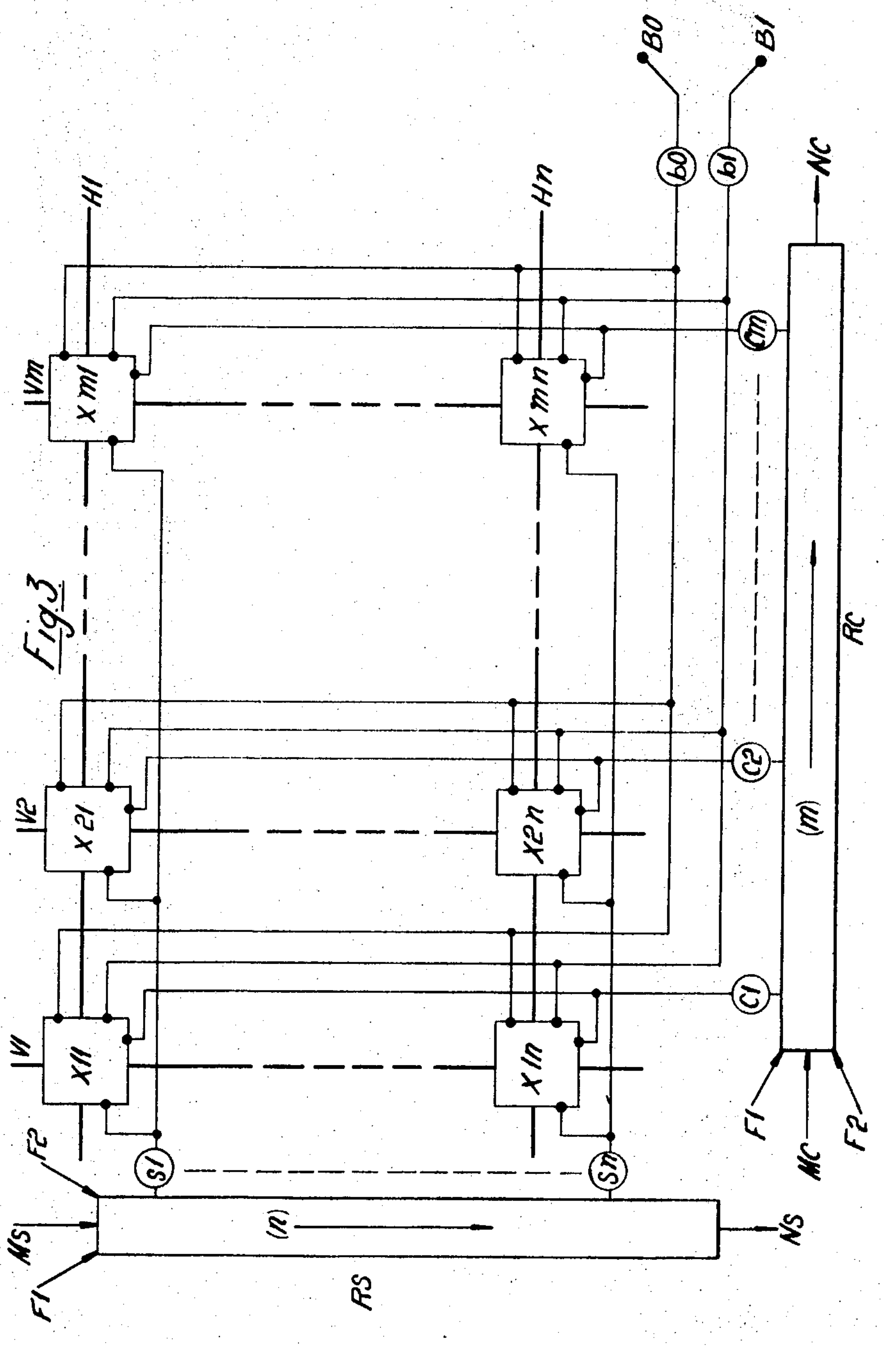
FIG. 3 shows an elementary multiselector matrix.

FIG. 3 shows an elementary multiselector matrix according to the invention which comprises horizontals H1, H2...H*n* and verticals V1, V2...V*m*. At each cross-point a switching circuit like that shown in FIG. 1 is located. Amidst these circuits, those associated to horizontal H1 are referenced X11, X21...X*m*1 and those associated to horizontal H*n* are referenced X1*n*, X2*n*...X*mn*.

A horizontal selection conductor *s*1, *s*2...*sm* is associated to each horizontal and a vertical selection conductor *c*1, *c*2...*cm* is associated to each vertical. Moreover, conductors *b*0 and *b*1 are connected to each switching circuit.

In order to close (open) one of said circuits, circuit X11 for instance, a connection signal C1 and a selection signal S1 ($\overline{C1}$ and $\overline{S1}$) are applied to conductors *c*1 and *s*1 respectively. As it has already been explained with reference to FIG. 2, the NOR gate G1 (G0) of the circuit X11 delivers then a signal which sets the holding flip-flop A in the 1 (0) state so that transistors T1 and T2 are conducting (blocking).

The connection signals C1, C2...C*m* and the selection signals S1, S2...S*n* are delivered respectively by the shift registers R*c* and R*s* which comprise respectively *m* and *n* states. Such a register R*c* (R*s*) which comprises the clock inputs F1, F2 the signal input M*c* (M*s*) and the signal output N*c* (N*s*) controls the vertical (horizontal) selection in the matrix by means of data introduced therein in series form. It can be seen that a signal B0 or B1 must be applied when the registers are fully loaded.

When a selection stage of a telephone switch for instance, comprises several elementary multiselectors of the type shown in FIG. 3, the different R*s* (R*c*) registers are connected in series, the output N*s* (N*c*) of a register being connected to the input M*c* of the matrix located on its right below. In this way, a selection stage comprising *p x m* verticals and *q x n* horizontals (*p* and *q* are whole numbers) can be implemented in which both vertical and horizontal selection are effected by a code applied in series form to the free inputs of the registers.

Registers R*c* and R*s* are also designed with MOS-Ph transistors and can be, by way of a nonlimitative example, dynamic shift registers which are now available on the market. These registers operate in negative logic so that a digit 0 represents a signal C or S and a digit 1 represents a signal $\overline{C}$ or $\overline{S}$.

The elementary multiselector described above has been designed in order to minimize the number of outputs of the large scale integrated circuit in which it is incorporated. It comprises:

Three supply terminals for ground potential and potentials—U2 and—U3;

Six output terminals F1, F2, M*s*, M*c*, N*s* and N*c* related to registers R*s* and R*c*;

Two output terminals B0 and B1;

Two ($m+n$) outputs of speech wires H (H' and H'') and V (V' and V''). The total number of outputs is therefore $T=2(m+n)+ah11$.

While the principles of the above invention have been described in connection with specific embodiments and particular modifications thereof it is to be clearly understood that this description is made by way of example and not as a limitation of the scope of the invention.

In particular, transistors of opposite polarity can be utilized by inverting the polarity of the supply sources.

We claim:

1. An electronic switching system comprising, a plurality of cross-points incorporating switching circuits, each switching circuit including a MOS switching transistor having source and drain electrodes connected to conductors to be interconnected, said MOS switching transistor having a grid electrode, each cross-point further including a holding flip-flop circuit formed of a plurality of MOS transistors, each of said flip-flop circuits having a 1 output connected to the grid electrode of the related MOS switching transistor when said flip-flop is in the 0 state.

2. An electronic switching system as claimed in claim 1, including a multiselector matrix comprising *m* verticals and *n* horizontals formed by vertical selection conductors *c*1, *c*2...*cm* and horizontal selection conductors *s*1, *s*2...*sn*, two control conductors *b*0 and *b*1 associated with said matrix, means for selecting a particular switching circuit S*jk* located at the intersection of a vertical *j* and of a horizontal *k* by applying a signal C*j* to conductor *cj* and a signal S*k* to conductor *sk*, said means for selecting including the flip-flop circuit A*jk* in said switching circuit S*jk* which is set to a 1 or 0 state and coupled to control conductors *b*0 and *b*1, said state of the flip-flop A*jk* being determined by a closing signal B1 on the conductor *b*1 or a release signal BO on the conductor *b*at the same time that signals are supplied over *j* and *k* conductors.

3. An electronic switching system as claimed in claim 2, including first and second shift registers, means connecting the first shift register to the horizontal selection conductors *s*1, *s*2...*sn* and means connecting the second shift register to the vertical selection conductors *c*1, *c*2....*cn*, means feeding coded signals in series form to the shift registers to control the selection of the switching circuit S*jk*, and means for applying said control signal B1 or said release signal B0 once the registers are fully loaded.

4. An electronic switching system as claimed in claim 1, wherein said system comprises a rectangular matrix of cross-points, and wherein each cross-point further includes a gating circuit for each output of said flip-flop circuit, and wherein each dimension of said matrix includes a shift register for providing a signal to the gating circuits of a selected one of said cross-points, and means for supplying a control signal to one of the gating circuits of said cross-point to change the state of the flip-flop at said cross-point and the switching transistor thereat.